(12) United States Patent
Knudson et al.

(10) Patent No.: US 11,424,947 B2
(45) Date of Patent: Aug. 23, 2022

(54) GROUPING ELECTRONIC DEVICES TO COORDINATE ACTION BASED ON CONTEXT AWARENESS

(71) Applicant: Lenovo (Singapore) Pte. Ltd., New Tech Park (SG)

(72) Inventors: Ryan Charles Knudson, Durham, NC (US); Russell Speight VanBlon, Raleigh, NC (US); Roderick Echols, Chapel Hill, NC (US); Jonathan Gaither Knox, Morrisville, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 1079 days.

(21) Appl. No.: 15/666,712

(22) Filed: Aug. 2, 2017

(65) Prior Publication Data
US 2019/0044745 A1 Feb. 7, 2019

(51) Int. Cl.
| | |
|---|---|
| *H04L 12/28* | (2006.01) |
| *H04W 4/029* | (2018.01) |
| *H04W 4/08* | (2009.01) |
| *H04W 84/18* | (2009.01) |
| *H04L 67/50* | (2022.01) |
| *G06F 3/16* | (2006.01) |
| *H04L 67/52* | (2022.01) |
| *H04L 67/63* | (2022.01) |

(52) U.S. Cl.
CPC ............ *H04L 12/282* (2013.01); *G06F 3/167* (2013.01); *H04L 12/2821* (2013.01); *H04W 4/029* (2018.02); *H04W 4/08* (2013.01); *H04L 67/52* (2022.05); *H04L 67/535* (2022.05); *H04L 67/63* (2022.05); *H04L 2012/2841* (2013.01); *H04W 84/18* (2013.01)

(58) Field of Classification Search
CPC ........... H04N 21/4302; H04N 21/4307; H04N 21/8547
USPC .................................................. 709/231, 248
See application file for complete search history.

(56) References Cited

U.S. PATENT DOCUMENTS

| | | | |
|---|---|---|---|
| 2002/0135618 A1* | 9/2002 | Maes | G06F 3/0481 715/767 |
| 2013/0205311 A1* | 8/2013 | Ramaswamy | H04N 21/44213 725/9 |
| 2014/0118616 A1* | 5/2014 | Oughriss | H04N 7/025 348/462 |

(Continued)

*Primary Examiner* — Jefferey F Harold
*Assistant Examiner* — Franklin S Andramuno
(74) *Attorney, Agent, or Firm* — The Small Patent Law Group LLC; Dean D. Small

(57) ABSTRACT

A computer implemented method, device and computer program device are provided that are under control of one or more processors configured with executable instructions. The method receives a user instruction to perform an action, identifies context awareness information concerning an environment where the action is to be performed. The environment includes a plurality of candidate electronic devices. At least one of the candidate electronic devices provides digital personal assistant (DPA) functionality. The method groups a collection of one or more responsive electronic devices, from the plurality of candidate electronic devices, based on the context awareness information. The method communicates the instruction to the collection of one or more responsive electronic devices to coordinate the action by the collection of one or more responsive electronic devices.

21 Claims, 4 Drawing Sheets

(56) References Cited

U.S. PATENT DOCUMENTS

| | | | | |
|---|---|---|---|---|
| 2014/0319232 A1* | 10/2014 | Gourlay | ............. | G05D 23/1905 |
| | | | | 236/51 |
| 2015/0170638 A1* | 6/2015 | Bezar | ...................... | G10L 17/26 |
| | | | | 704/246 |
| 2016/0078870 A1* | 3/2016 | Helm | ...................... | G10L 17/22 |
| | | | | 704/275 |
| 2017/0053110 A1* | 2/2017 | Wang | ...................... | G06F 21/32 |

* cited by examiner

GROUPING ELECTRONIC DEVICES TO COORDINATE ACTION BASED ON CONTEXT AWARENESS

FIELD

The present disclosure relates generally to coordinated action between multiple electronic devices, and more particularly to coordinated action based on context awareness.

BACKGROUND OF THE INVENTION

In today's technology driven society, many users own multiple electronic devices that can be used for different types of communications, different tasks, and/or at different locations. For example, a user may own multiple digital personal assistant (DPA) devices that are distributed throughout a home.

Generally, a DPA device is an electronic device with a user interface that simulates human traits that allows a human user to interact with the electronic device in a manner similar to interacting with another person, rather than a machine. For example, the DPA device may include a voice recognition system that interprets the voice input of the user and executes services or perform tasks in response thereto. The DPA device also includes a voice interface to audibly respond to the user in a natural language form. Typically, a DPA device operates on a single device with dedicated components to interact with the user. For example, the DPA device may have a built-in microphone to receive user requests and a built-in speaker to provide communications. In addition, the DPA device can include a component interface that can connect to wired or wireless electronic devices, such as smart phones, smart televisions, tablets, smart watches, and speakers to communicate content.

However, conventional DPA devices cannot be grouped with one another, automatically or manually, for coordinated action. Today, DPA devices and many other types of electronic devices operate independent of one another in stand-alone configurations. Instead, a user is required to provide separate instructions to each DPA device in order to direct the DPA device to perform an action of interest. For example, when a first DPA device in one room is playing music, if the user moves to a different room having a second DPA device, the user must provide a separate instruction for the second DPA device to begin playing music, resulting in the first and second DPA devices playing different music or the same music in an un-synchronized manner.

Further, today dedicated network-based audio systems are offered for home use. The system includes multiple audio devices that communicate wirelessly with one another over a local network. An application is provided on an electronic device, such as a smart phone or tablet device that allows the user to control the individual audio devices, such as adding and removing the audio devices from a group, and separately controlling the volume of the audio devices. However, dedicated network-based audio systems require manual user inputs to indicate which of the individual audio devices to include in a group.

Accordingly, a need remains for methods and devices to automatically group electronic devices for coordinated action.

SUMMARY

In accordance with embodiments herein, a method is provided. The method is under control of one or more processors configured with executable instructions. The method receives a user instruction to perform an action, identifies context awareness information concerning an environment where the action is to be performed. The environment includes a plurality of candidate electronic devices. At least one of the candidate electronic devices provides digital personal assistant (DPA) functionality. The method groups a collection of one or more responsive electronic devices, from the plurality of candidate electronic devices, based on the context awareness information. The method communicates the instruction to the collection of one or more responsive electronic devices to coordinate the action by the collection of one or more responsive electronic devices.

Optionally, the plurality of electronic devices may include a DPA device. One or more of the identifying, grouping and communicating may be performed by the DPA device. The method may determine whether to include the DPA device in the collection of one or more responsive electronic devices that may perform the action. The context awareness information may include information indicative of a condition present in the environment in which the corresponding electronic devices are located. The collection of responsive electronic devices may include multiple DPA devices. The communicating the instruction may include coordinating an operation of the multiple DPA devices to act jointly in a manner perceived by one or more individuals within the environment.

Optionally, the environment may represent a physical region in which the multiple DPA devices are located and in which the joint action is one or more of heard, seen, or felt by the one or more individuals. The identifying may include determining activity in a region surrounding a first electronic device from the plurality of electronic devices. The determining activity may be based on one or more of calendar data, motion data, sleep habit data or device usage data. The method may identify the plurality of candidate electronic devices based on availability on a network.

In accordance with embodiments herein, a device is provided. The device comprises an input to receive a user instruction to perform an action, a processor, and a memory storing program instructions accessible by the processor. Responsive to execution of the program instructions, the processor performs the following: identifying context awareness information concerning an environment where the action is to be performed, the environment including a plurality of candidate electronic devices, at least one of the candidate electronic devices to provide digital personal assistant (DPA) functionality; and grouping a collection of one or more responsive electronic devices, from the plurality of candidate electronic devices, based on the context awareness information; and a transceiver to communicate the instruction to the collection of one or more responsive electronic devices to perform the action by the collection of one or more responsive electronic devices.

Optionally, the device may be a DPA device. The processor may further modify the instruction to include a device command to open a streaming channel and to play audio content that is streamed to the collection of one or more responsive electronic devices. The context awareness information may include information indicative of a condition present in the environment in which the corresponding electronic devices are located. The collection of one or more responsive electronic devices may include multiple DPA devices. The transceiver may send the instruction to the multiple DPA devices to coordinate an operation of the multiple DPA devices to act jointly in a manner perceived by one or more individuals within the environment.

Optionally, the device may further comprise an activity or control circuit that may include one or more of a motion sensor, light switch, room thermostat, door locking circuit, or appliance to provide the context awareness information. The processor may determine activity in a region surrounding a first electronic device from the plurality of electronic devices. The activity may be associated with the contact awareness information. The processor may determine the activity based on one or more of calendar data, motion data, sleep habit data or device usage data.

In accordance with embodiments herein, a computer program product is provided comprising a non-signal computer readable storage medium comprising computer executable code to: receive a user instruction to perform an action, identify context awareness information concerning an environment where the action is to be performed, the environment including a plurality of candidate electronic devices, at least one of the candidate electronic devices to provide digital personal assistant (DPA) functionality, automatically group a collection of one or more responsive electronic devices, from the plurality of candidate electronic devices, based on the user instruction and the context awareness information and communicate the instruction to the collection of one or more responsive electronic devices to perform the action by the collection of one or more responsive electronic devices.

Optionally, the computer executable code may further store a list of one or more candidate electronic devices that are registered for use within a network. The list may include unique identifying information for the electronic devices, as well as operating characteristics of the electronic devices relevant to a type of action that the electronic devices perform. The computer executable code may store a DPA device application that includes voice recognition. The DPA device application may interpret natural language input in spoken form to infer intent therefrom, and perform actions based on the inferred intent.

DETAILED DESCRIPTION

Figure 1:
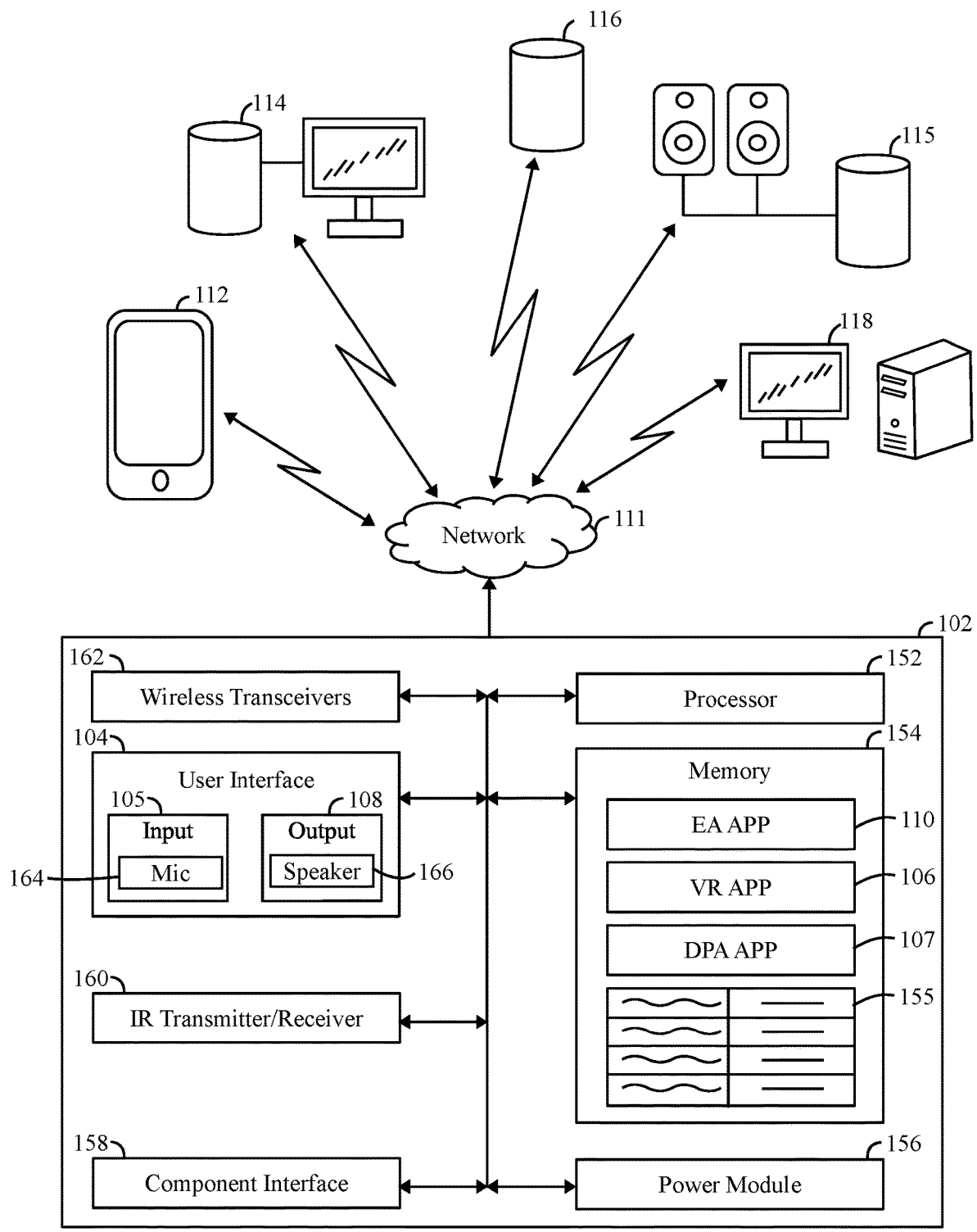
FIG. 1 illustrates a system for selecting a collection of one or more electronic devices to perform a coordinated action in combination based on context awareness information in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Terms

The term "context awareness information" refers to information indicative of a condition present in an environment in which one or more electronic devices are located. Non-limiting examples of context awareness information include a proximal range of a user and/or nonusers to electronic devices within an environment and current activities underway in regions surrounding corresponding electronic devices.

The term "environment" refers to a physical region in which one or more electronic devices are located and in which actions performed by the electronic device are perceived (e.g., heard, seen, felt) by individuals. By way of example, an environment may refer to one or more rooms within a home, office or other structure. An environment may or may not have physical boundaries. For example, an environment instead be defined based upon a range over which individuals may perceive actions by electronic devices. For example, an environment may refer to one or more of a pool area, a deck on a house, a backyard, an exterior area outside of an office building, a commercial area and the like, where approximate virtual boundaries of the environment correspond to the range over which actions by electronic devices may be heard, seen, felt or otherwise perceived. When an electronic device is portable and/or handheld, an environment associated with the electronic device may shift over time when the electronic device is moved. For example, an environment surrounding a smart phone, tablet device or laptop computer moves with the smartphone, tablet device or laptop computer. An environment surrounding a DPA device will shift each time the DPA device is relocated, such as when moved between different rooms of a home, office building or other residential or commercial structure.

The term "environment related action" refers to actions performed by one or more electronic devices that are perceived by all or some of the individuals within a corresponding environment. Nonlimiting examples of environment related actions include playing music, movies, television programming or other audio and/or video entertainment content, instructional content, work related content and the like.

The term "digital personal assistant", "DPA", "virtual assistant", "intelligent digital assistant", as used throughout, shall generally refer to any electronic device that has a user interface or information processing system that uses a voice recognition system, such as a Natural language understanding (NLU), automatic speech recognition (ASR), or text-to-speech synthesis (TTS), to interpret natural language input in spoken form and/or textual form to infer intent, and perform actions based on an inferred user intent. For example, a digital personal assistant may receive a user instruction in the form of a natural language command, request, statement, narrative, and/or inquiry. A user instruction may seek either an informational answer or performance of a task by the digital personal assistant. Accordingly, the digital personal assistant can perform the requested task and/or provide responses in audio and/or visual form, such as natural language, music, video, text, animations, etc.

Overview

FIG. 1 illustrates a system 100 for selecting a collection of one or more electronic devices to perform a coordinated action in combination based on context awareness information in accordance with embodiments herein. The system 100 includes an electronic device 102 that is configured to provide digital personal assistant (DPA) functionality. For example, the electronic device 102 may represent an Amazon Echo® device, Google Home™ device, and the like.

As shown in FIG. 1, the electronic device 102 includes components such as one or more processors 152 (e.g., a microprocessor, microcomputer, application-specific integrated circuit, etc.), one or more local storage medium (also referred to as a memory) 154, a user interface 104 which includes one or more input circuits 105 and one or more output circuits 108, a power module 156, a component interface 158, an infrared (IR) transmitter/receiver 160 and one or more wireless transceivers 162. All of these components can be operatively coupled to one another, and can be in communication with one another, by way of one or more internal communication links, such as an internal bus.

The input circuit 105 receives user instructions in various manners, such as using a voice recognition (VR) application 106. The processors 152 execute instructions stored in the memory 154 to interpret and perform actions based on user instructions that are received through the input circuit 105. The user instruction may represent requests of various types. By way of example, some types of user instructions seek information, such as a question that may be answered by the electronic device 102 based on content stored therein and/or an automated searched over the Internet and the like. Other types of user instructions may instruct the electronic device 102 to perform various types of environment related actions, as described herein. An environment administration (EA) application 110 identifies context awareness information concerning an environment in which an environment related action is to be performed. The electronic device 102 communicates with other electronic devices 112-116 over a network 111, such as through a wireless transceiver 162. The electronic devices 112-116 operate in connection with corresponding regions of the environment that may be separate and distinct from one another, partially overlap, wholly overlap, and/or vary over time with movement of the corresponding electronic device 112-116.

The EA application 110 obtains context awareness information for regions and/or multiple environments. For example, the EA application 110 obtains context awareness information for separate regions or environments each of which correspond to a candidate electronic device 112-116. At least one of the candidate electronic devices 112-116 may provide digital personal assistant (DPA) functionality. As explained herein, the EA application 110 automatically selects and groups a collection of one or more responsive electronic devices from the plurality of candidate electronic devices 112-116. The automatic selection and grouping is based on, among other things, the user instruction and the context awareness information associated with all, some or each region. The EA application 110 also determines whether to pass the incoming user instruction directly to the collection of responsive electronic devices. Alternatively, the EA application 110 may adjust or otherwise modify the incoming user instruction and pass a modified user instruction to the collection of responsive electronic devices. A common modified user instruction may be passed to all of the collection of responsive electronic devices, and/or separately "individualized" user instructions may be passed to corresponding electronic devices in the collection.

The electronic device 102 includes an output circuit 108 and transceiver 202, one or both of which may output incoming and/or modified user instructions to the collection of responsive electronic devices. The electronic device 102 includes a voice recognition type user interface 104 and is configured to access the network 111 over a wired or wireless connection. As non-limiting examples, the electronic device 102 may access the network 111 through a wireless communications channel and/or through a network connection (e.g., the Internet). Additionally or alternatively, the electronic device 102 may be a wired or wireless communication terminal, such as a desktop computer, laptop computer, network-ready television, set-top box, and the like.

One or more of the electronic devices 112-116 may represent the same type or different types of device as the electronic device 102, and/or a speaker, home theater system, computer, mobile phone, television, communication content player, smart watch, and the like. The electronic device 102 communicates the user instructions to the collection of one or more responsive electronic devices over the network 111, and/or over a separated wired or wireless link there between. For example, an auxiliary output may be used to form a wired connection. Optionally, a Bluetooth link or other wireless link may for a direct connection wirelessly.

The electronic device 102 is configured to access the network resources 118, including web-based or network-based data, applications, and services, via the network 111. The network 111 may represent one or more of a local area network (LAN), a wide area network (WAN), an Intranet or other private network that may not be accessible by the general public, or a global network, such as the Internet or other publicly accessible network. The network 111 provides communication between the electronic device 102 and one or more network resources 118. It will be understood that, in some embodiments, the network resources 118 may represent a single entity or one or more physical or virtual servers that are configured to deliver online resources to the electronic device 102. Examples of the network resources 118 include, but are not limited to, web-based or network-based data storage services, social networking applications, shopping services, payment services, multimedia content delivery services, financial services and the like. The resources 118 may represent a Web service or a network service for an e-commerce business, financial institution, or any other commercial, noncommercial, personal, nonprofit or other entity.

The user interface 104 permits the user to operate the electronic device 102 for any of its intended purposes, such as administering the EA application 110, operating software applications, electronic communication, listening to audio media, and the like. The input circuit 105 can include one or more audio input circuits, such as a microphone 164 that is configured to receive audio input (e.g., instructions, requests) from the user. The output 108 can include one or more electronic devices, such as a speaker 166, that are configured to communicate notification alerts or notification content to the user. In association with the VR application 106, the user interface 104 allows the user to communicate with the electronic device 102 by receiving audio input in the form of natural language. The VR application 106 interprets the audio input received by the input circuit 105 and may generate communication content, such as a voice interface to audibly respond to the user in a natural language form. When the audio input represents an instruction, the VR application 106 passes the instruction to the EA application 110 to be processed as described herein.

Optionally, the input and output circuits 105, 108 may each include a variety of visual, audio, and/or mechanical devices. For example, the input circuit 105 can include a visual input device, such as an optical sensor or camera, and/or a mechanical input circuit such as a keyboard, keypad, selection hard and/or soft buttons, switch, touchpad, touch screen, icons on a touch screen, a touch sensitive areas on a touch sensitive screen and/or any combination thereof. Similarly, the output circuit 108 can include a visual output circuit such as a liquid crystal display screen, touch sensitive screen, a non-touch sensitive screen, a text-only display, a smart phone display, an audio output (e.g., a speaker or headphone jack), and/or any combination thereof and/or one or more light emitting diode indicators. The output circuit 108 is integral to (e.g., within a common housing) the electronic device 102.

The memory 154 may encompass one or more memory devices of a variety of forms (e.g., read only memory, random access memory, static random access memory, dynamic random access memory, etc.) and can be used by the processor 152 to store and retrieve data. The data that is stored by the memory 154 can include, but need not be limited to, operating systems, applications, user collected content, and informational data. Each operating system includes executable code that controls basic functions of the device, such as interaction among the various components, communication with external devices via the wireless transceivers 162, the component interface 158, and/or the IR transmitter/receiver 160, and storage and retrieval of applications and data to and from the memory 154. Each application includes executable code that utilizes an operating system to provide more specific functionality for the communication devices, such as file system service and handling of protected and unprotected data stored in the memory 154.

The memory 154 stores various content including, but not limited to, the VR application 106, the NA application 110 and a DPA device application 107. The DPA device application 107 interacts with the VR application 106 to provide voice recognition. The DPA device application 107 interprets natural language input in spoken form or text form, infers intent therefrom, and perform actions based on the inferred intent. The VR and NA applications 106, 110 manage one or more operations of the electronic device 102. The VR and NA applications 106, 110 include instructions accessible by the one or more processors 152 to direct the processor 152 to implement the methods, processes and operations described herein including, but not limited to, the methods, processes and operations illustrated in the Figures and described in connection with the Figures. In an alternative embodiment, the VR and NA applications 106, 110 may operate from one or more storage medium (also referred to as cloud storage). The memory 154 also stores one or more lists 155 that contain one or more candidate electronic devices that are registered for use within the network 111. The candidate electronic devices may be added to the list 155 at the time the electronic devices are registered. The list 155 may include unique identifying information for each of the electronic devices thereon, as well as operating characteristics or attributes of the electronic devices that may be relevant to the types of actions that the electronic devices may be able to perform. For example, the characteristics or attributes may indicate that an electronic device 115 is connected to a stereo system, electronic device 116 is operating independently, and electronic device 114 is connected to a smart television.

Among other things, the NA application 110 manages operation of the processor 152 in association with identifying user instructions, identifying context awareness information for regions and/or an environment(s), automatically grouping a collection of responsive electronic devices and communicating the user instruction to the collection of the electronic devices 112-116. The processor 152 may identify the context awareness information based on a history of device usage, a status of the electronic devices, a time and/or date, the location or environment of the user, the proximity of the user to the DPA device or electronic devices, and a presence of non-users in one or more corresponding environments.

The processor 152 identifies the availability of electronic devices 112-116 operatively connected to the electronic device 102. For example, the processor 152 can direct the transceiver 162 to transmit an availability inquiry request and listen for responses from the electronic devices 112-116. The processor 152 analyzes availability data from the responses to obtain information indicative of the availability of each electronic device. Optionally, the processor 152 analyzes data from the responses to obtain additional information about each audio device, such as the manufacturer, make, model, version of the device.

Figure 2:
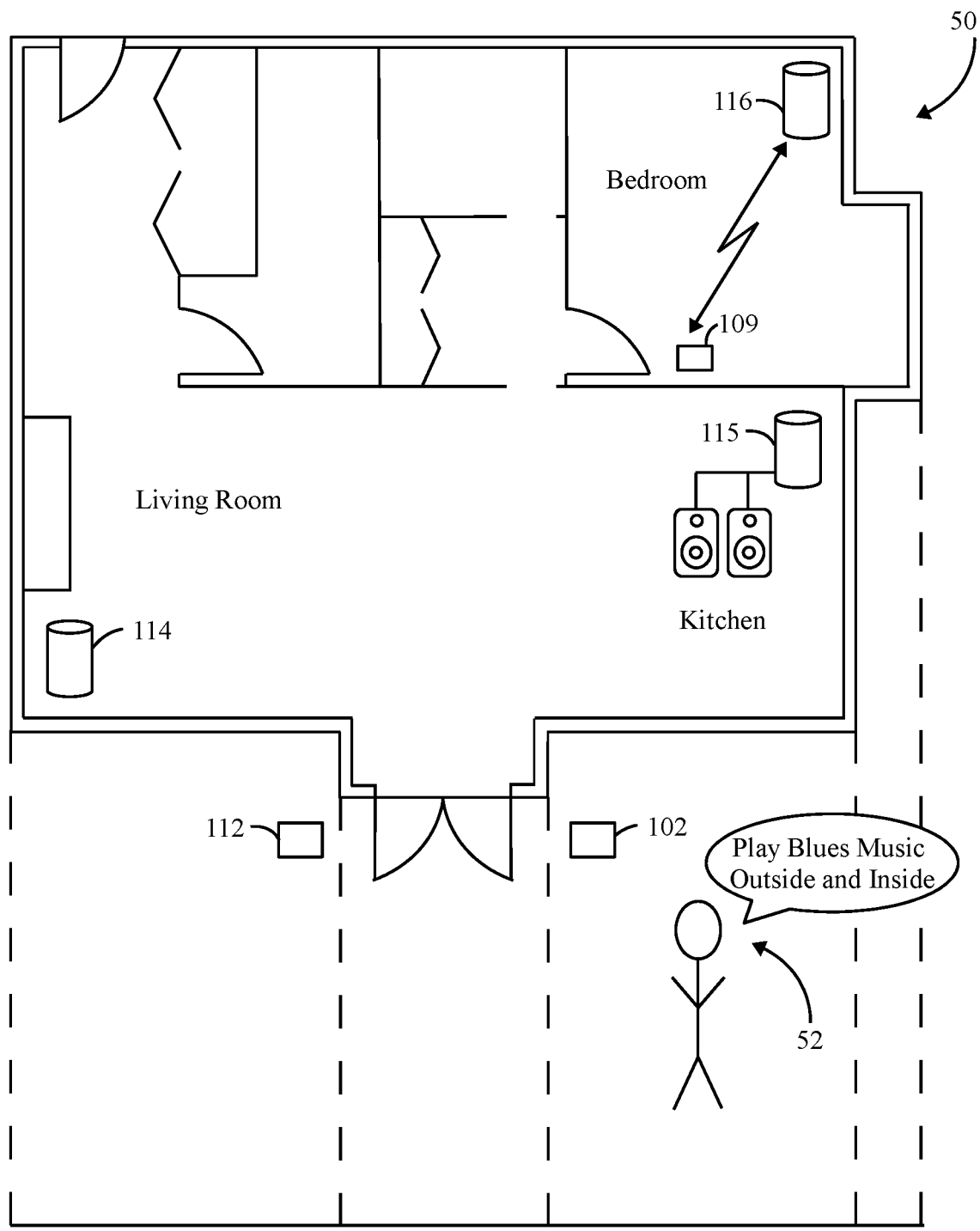
FIG. 2 illustrates a top plan view of an environment in which embodiments herein may be implemented.

FIG. 2 illustrates a top plan view of an environment in which embodiments herein may be implemented. The environment 50 may represent a home, office or other structure. In the example of FIG. 2, the environment 50 represents a home with an outdoor exterior region 52, a living room region, kitchen region and bedroom region. The electronic devices 102, 112-116 are shown at representative locations distributed throughout the environment 50. As one example, all of the electronic devices 102, 112-116 may offer DPA device functionality. Alternatively, one or more of the electronic devices 102, 112-116 may not offer DPA device functionality. Embodiments herein consider context awareness information indicative of individuals that are within a proximal range of the electronic devices 102, 112-116, as well as the activities currently being undertaken by the individuals proximate to the electronic devices 102, 112-

116. The context awareness information is considered to determine which of the electronic devices 102, 112-116 to be included within a collection of responsive devices. As one simple example, when a user is at home, the user may be afforded the option to play music over all of the DPA devices distributed throughout a home, based on a single verbal instruction. The context awareness information is used to determine whether each individual electronic device (e.g., DPA device) should join a collection. For example, when a child is sleeping in a bedroom region, a DPA device present in the bedroom region would be excluded from participating in a collective response. As another example, when another individual (e.g., parent or spouse) is on a conference call or conducting other work activity (e.g., in a home office region), a corresponding locally positioned DPA device would be excluded from a collective response.

With reference to the example of FIG. 2, a user may direct a verbal user instruction to a local electronic device 102, such as "Play Classical" or "Play blues music inside and outside". As explained herein, before blindly playing the music over every electronic device attached to a network, the electronic device 102 collects and analyzes context awareness information in connection with the various regions within the available environment where other electronic devices 112-116 are located. Based on the context awareness information and the nature of the user instruction, the electronic device 102 determines whether, and to what extent, to implement the user instruction. For example, a second electronic device 112 may be identified to be outside in the region near the user and the first electronic device 102. The second electronic device 112 is added to a collection. The third and fourth electronic devices 114 and 115 may return context awareness information indicating that one or more people are in the living room region and/or kitchen region, but are not listening to any other music or watching TV. Thus, the third and fourth electronic devices 114 and 115 are added to the collection.

A fifth electronic device 116 may return context awareness information indicating that a baby is sleeping in a bedroom region, the lights are off in the bedroom, or a spouse is working in a home office region. Based on the information provided by the fifth electronic device 116, the local electronic device 102 may determine to exclude the fifth electronic device 116 from the collection.

In the present example, the electronic device 116 is shown to have a wireless communications link with another activity or control circuits 109 in the bedroom. For example, the activity or control circuit 109 may represent a doorlock, a light switch, a local thermostat, a motion detector and the like. The activity or control circuit 109 may provide activity data to the electronic device 116 that is returned to the local electronic device 102. Additionally or alternatively, the electronic device 116 in the bedroom may interpret the activity data from the activity or control circuit 109 before for providing context awareness information.

In the foregoing example, the analysis of the context awareness information, and determination of which electronic devices to include, is performed at the "local" electronic device 102 that receives the verbal user instruction. Optionally, the analysis and determination may be performed at one or more other electronic devices 112-116, and/or remotely at a remote network resource (e.g., 118 in FIG. 1).

Figure 3:
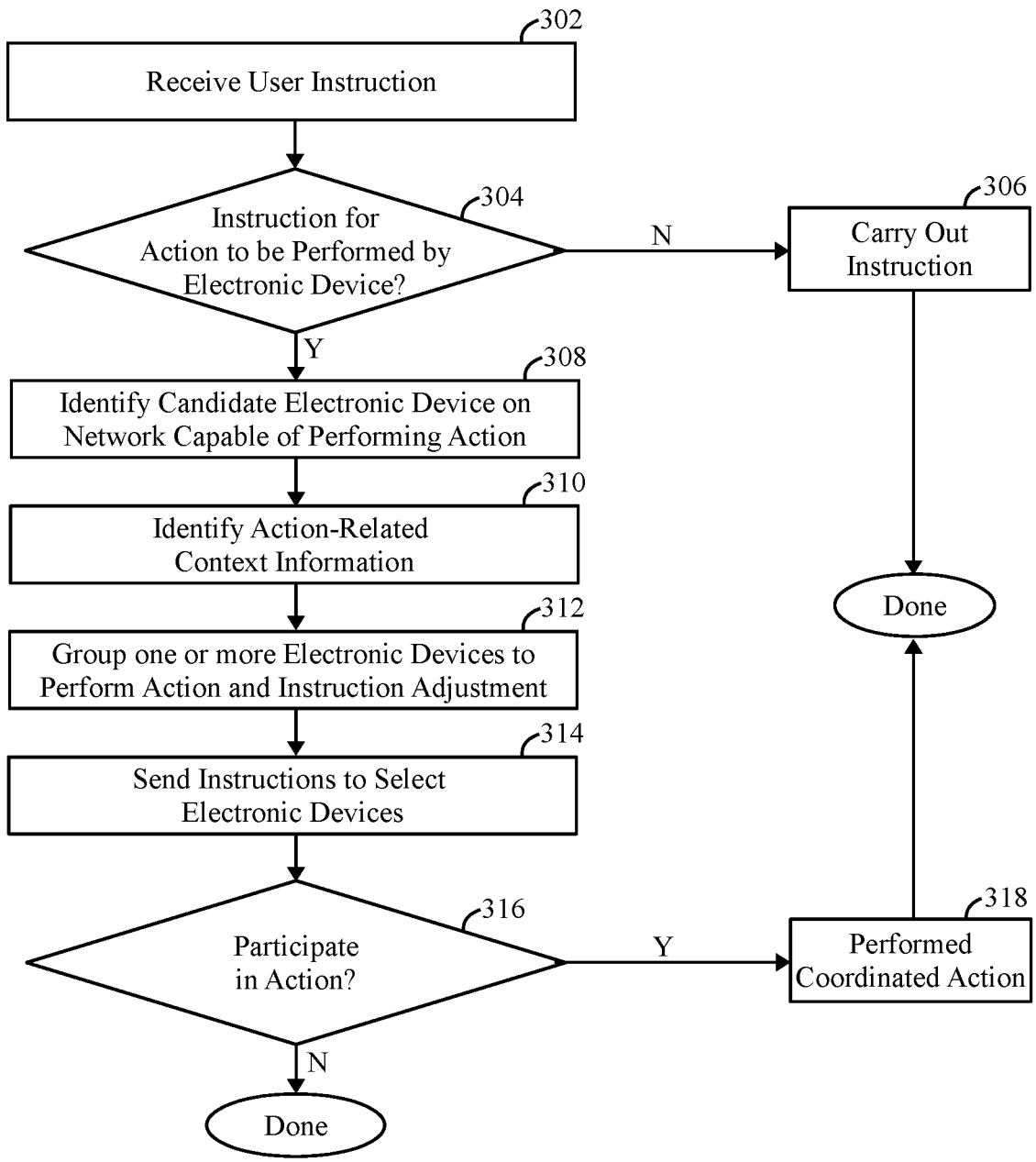
FIG. 3 illustrates a process for managing coordinated joint action by a collection of one or more responsive electronic devices in accordance with embodiments herein.

FIG. 3 illustrates a process for managing coordinated joint action by a collection of responsive electronic devices in accordance with embodiments herein. At 302, one or more processors of an electronic device 102 receive a user instruction. The electronic device 102 may represent a DPA device or another type of electronic device. For example, the input circuit 105 (FIG. 1) of the user interface 104 receives a user instruction that represents a request for information. As described herein, a non-limiting example of user instructions that have an environment related action, may include an instruction directing an electronic device 102 to play music, or a movie or television content, within a corresponding environment (e.g., a living room and kitchen, a first floor and deck area of a home, etc.). It is recognized that numerous other types of user instructions may be received and acted upon in connection with embodiments herein.

At 304, the one or more processors analyze the user instruction to determine whether the user instruction represents a type of instruction that corresponds to an environment related action. As noted herein, while various types of user instructions may be received, not all user instructions call for an environment related action in response thereto. For example, the request may ask the time of day, current weather conditions, the score of a sporting event, election results, stock market prices for a particular stock, and the like. When the user instruction does not have a corresponding environment related action to be performed, flow moves to 306.

At 306, the one or more processors carry out the user instruction. The processor 152 analyzes the user instruction and determines whether the electronic device 102 has sufficient stored information to directly respond to the request for information. The processor 152 would be able to determine the time of day without external assistance, whereas other types of questions may need external input. The user instruction may represent a request for information that is not directly available on the electronic device 102 (e.g., current weather conditions, the score for a sporting event, etc.). When an answer to the request is not available on the electronic device 102, the processor 152 directs the transceiver 162 to access the network resources 118 through the network 111 in connection with obtaining a response. The network resource 118 will return an informational answer that may be provided in a natural language audio response, as text, audio and/or video presented on the electronic device or on another electronic device.

Returning to 304, when the user instruction does have a corresponding environment related action to be performed, flow moves to 308. At 308, the one or more processors identify a plurality of candidate electronic devices that are available on a network and are capable of performing the environment related action. For example, the processors 152 may identify one or more candidate electronic devices based on a list 155 of electronic devices that are registered for use within a network. The memory 154 (FIG. 1) may maintain the list 155 of electronic devices, along with descriptors indicative of the operating characteristics of the corresponding electronic devices. For example, when the user instruction directs music to be played, the list 155 may be reviewed to identify electronic devices that have characteristics appropriate for playing music. For example, the characteristics may include an indication as to whether the electronic device has an internal speaker systems with sufficient quality, is connected to a speaker system, and the like. The characteristics may also indicate a location of the electronic device within an environment (e.g., in a family room, kitchen, deck or patio area, poolside, office, bedroom and the like. One or more characteristics may be entered by the user at the time of registration or otherwise, such as an indication from the user (e.g., provided at the time of registration) to designate the types of environment related actions in which the electronic device should participate.

Continuing with the foregoing example, when music or a movie is to be played in a living room or family area, the candidate electronic devices may represent devices connected to stereo equipment, while a smart phone, tablet device or laptop computer is omitted from the plurality of candidate electronic devices.

Additionally or alternatively, when a movie or television show is being played in a living room region or family room region, and the user needs to leave the local region (e.g., to check on kids, get something from the kitchen, go to the bathroom), a user's smart phone or other handheld electronic device may be added to the collection in order to play the audio for the movie or television show while the user is out of the living room or family room.

At 310, the one or more processors obtain context awareness information concerning an environment in which the action is to be performed. For example, the context awareness information may already be stored on the electronic device 102 that receives an incoming user instruction. Additionally or alternatively, the electronic device 102 may convey a request to one or more other electronic devices 112-116 to collect context awareness information from one or more of the electronic devices 112-116. The request may be conveyed to all electronic devices 112-116 and/or only to the candidate electronic devices identified at 308. For example, an electronic device 102 may send a request to a DPA device to request the last time that a user was detected in a presence of the DPA device. The electronic device 102 may send a request to a smart phone, tablet device or laptop computer to request an indication as to whether a user is presently utilizing, or has recently utilized, the smart phone, tablet device or laptop computer. The electronic device 102 may send a request seeking information indicating the identity of individuals who are present near a DPA device or other electronic device (e.g., John, Lisa, children present, children asleep in the room, are multiple people present versus one individual).

The context awareness information refers to information indicative of a condition present in an environment in which one or more electronic devices are located. Nonlimiting examples of context awareness information including a proximal range of a user and/or nonusers to electronic devices within an environment, current activities underway in regions surrounding corresponding electronic devices. The context awareness information may represent device usage data from a smart phone, tablet device, computer, etc., such as device usage data indicating that an individual is currently engaged in a phone conversation, work related activity, reading a book, watching a different program, listening to different music on the smart phone, tablet device or computer. Optionally, the context awareness information may represent calendar data obtained from an electronic calendar maintained in the cloud, and/or on a smart phone, tablet device, computer or other electronic device. Optionally, the context awareness information may represent sleep habit data obtained from an electronic device, such as a smart phone utilized by the individual to set an alarm, enter a do not disturb indication and the like.

Additionally or alternatively, the electronic device 102 may obtain context awareness information from other activity or control circuits, such as a motion sensor, light switch, room thermostat, door locking circuit, appliance and the like. Activity and control circuits may provide various types of indications, such as movement, activity or a lack thereof within a monitored environment, as well as a number of individuals within the environment. For example, a presence of one or more individuals may be indirectly inferred when a light switch is in an on-state, a room thermostat adjusted to an expected comfortable range, a door locking circuit is unlocked, and/or an electronic appliance is utilized.

At 312, the one or more processors automatically select and group a collection of the responsive electronic devices from the plurality of candidate electronic devices. The automatic selection and grouping are based at least in part on the user instruction and/or the context awareness information. For example, when the user instruction request that music is to be played, the collection may be limited to electronic devices that are on the same floor as, outside or geographically near the electronic device that received the incoming user instruction. Optionally, the responsive collection may exclude an electronic device in a child's bedroom when a parent request music to be played downstairs. Optionally, the responsive collection may exclude an electronic device in a parents home office when a child or spouse request music to be played in another part of a house or outside. The processors may store a responsive collection list in memory of the local electronic device and/or elsewhere.

At 312, optionally, the one or more processors also provide any appropriate adjustments to the user instruction. For example, different types of electronic devices may respond to different types of user instructions. At 314, the one or more processors communicates the instruction (original or modified) to the select electronic devices within the responsive collection. At 316, the one or more processors of the electronic device 102 determine whether to participate in the action. At 318, the collection of responsive electronic devices participate in a coordinated environment related action.

For example, a DPA device electronic device 114 may respond only when an instruction is preceded by an authorizing command (e.g., a name assigned to the device). When the DPA device electronic device 114 requires a preceding authorization command, the one or more processors of the electronic device 102 may add the corresponding authorization command to the user instruction when the user instruction does not already include the authorization command. For example, a user may provide an instruction "Lisa, play blues music", where "Lisa" represents the authorization command for the particular electronic device 102, to which the user is speaking. The second DPA device electronic device 114 may have a different name assigned (e.g., Bob). Accordingly, the electronic device 102 may replace the preceding command "Lisa" with a different preceding command "Bob" and deliver the message "Bob, play blues music" to the DPA device electronic device 114.

Alternatively, when the first electronic device 102 receives a spoken instruction, the first electronic device 102 may modify the spoken instruction to form a device-type command, which represents the modified instruction. For example, the device-type command may include a unique identifier associated with a third electronic device 112 (e.g., a table device or Amazon Firestick® device coupled to a T.V. or stereo). The device-type command may also include a data packet that includes a command to open a streaming channel and to play audio content that is streamed to the third electronic device 112 from the first electronic device 102. The third electronic device 112 would confirm that the unique identifier is addressed thereto, and would open a channel as directed and play the incoming streaming audio content.

Optionally, embodiments herein may implement actions that are dependent on user instructions, received at a first electronic device, requesting information concerning a second electronic device. For example, a user may provide a verbal user instruction "What music is playing upstairs?" to a local DPA device closest to the user. In connection there with, the local DPA device may obtain context awareness information from a second DPA device that is located "upstairs". The local DPA device may respond to the user by providing a name or other information concerning the music or by playing the music that is already playing upstairs. In the present example, the local DPA device would be joined to a responsive collection in which the second/upstairs DPA device streams the music that is already playing upstairs to the local DPA device proximate to the user. Additionally or alternatively, the user may direct the local DPA device to turn down or stop the music playing in the second/upstairs DPA device. Additionally or alternatively, the second DPA device may be designated based on the user providing instructions to the second DPA device. For example, the user at the local DPA device may provide a verbal user instruction "What are my kids listening to?", Without knowing which other DPA device the children are using. In response thereto, the local DPA device would obtain context awareness information from other electronic devices within the network, and review the context awareness information to determine who is providing the instructions to, and what music is being played on, the other electronic devices. The local DPA device would then respond to answer the user's question and/or begin playing the same audio content to which the children are listening.

Figure 4:
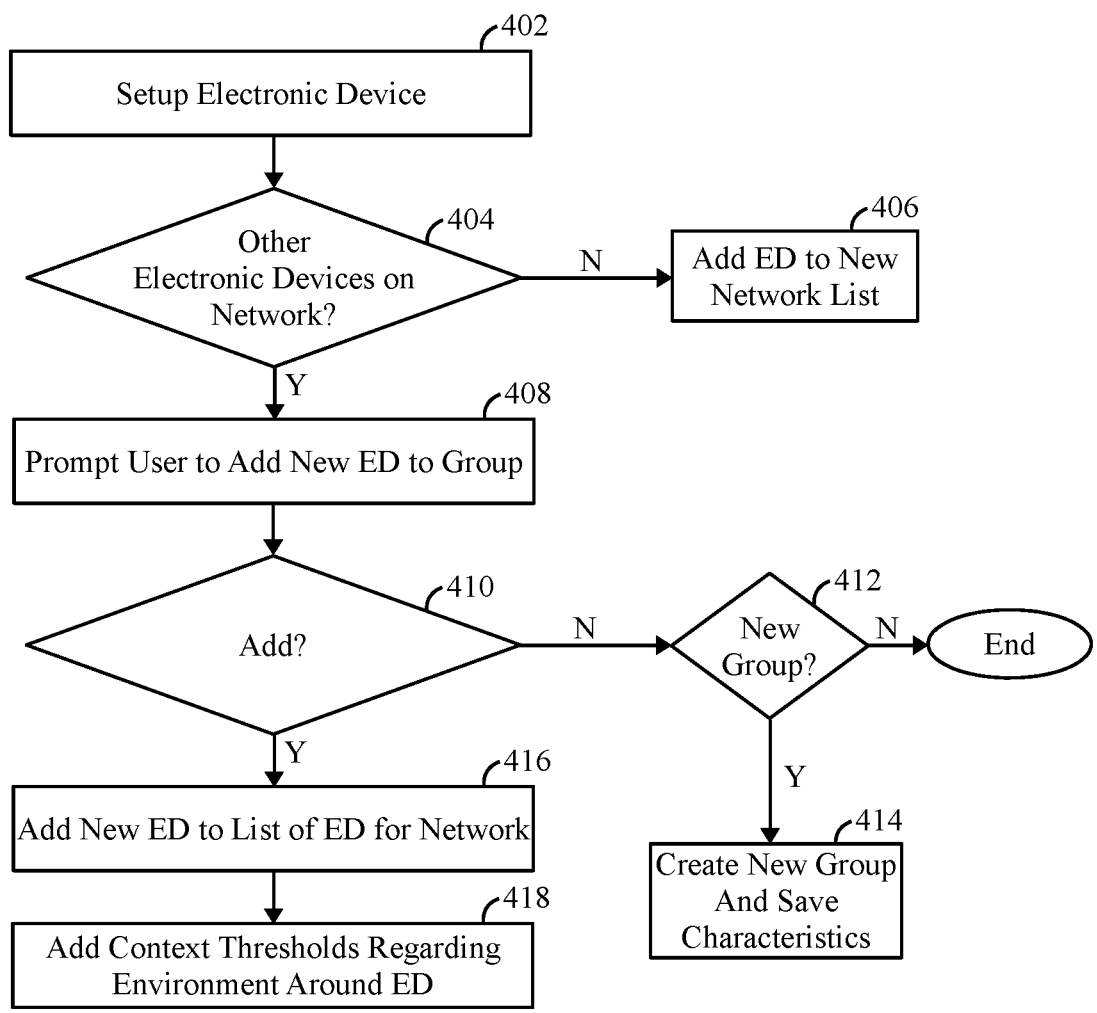
FIG. 4 illustrates a process for registering electronic devices with a network in accordance with embodiments herein.

FIG. 4 illustrates a process for registering electronic devices with a network in accordance with embodiments herein. The operations of FIG. 4 may be performed by one or more processors of a new electronic device being registered and/or by an electronic device already registered on a network and/or by a remote resource (e.g., remote resource 118 in FIG. 1). At 402, an electronic device is initially set up. For example, one or more processors of the electronic device and/or remote resource may step through a series of questions and operations to collect various information, such as user preferences, network ID information, a local environment where the electronic devices are located, and the like. At 404, the one or more processors determine whether other electronic devices already exist on the network. When no other electronic devices exist on the network, flow moves to 406 where a new network list is created and the new electronic device is automatically added to the newly created list. Operational information concerning the electronic device is also stored with the list, such as a device identifier, device hardware/software capabilities and functionality, hardware/software versions, connections to other devices (e.g., televisions, appliances, stereo systems, security circuits, locking circuits, thermostats and the like).

Returning to 404, when other electronic devices already exist on a network, flow moves to 408. At 408, the one or more processors prompt the user to determine whether the user desires to add the new electronic device to a group of electronic devices to be associated with the network. As a further option, the user may be prompted for more specific information concerning one or more types of actions for which the new electronic device is available for use. For example, the user may be prompted to indicate whether the user wants to play music over the newly added electronic device. Additionally or alternatively, the user may be prompted as to whether the user wants to use the new electronic device in connection with creating a surround-sound system for a television or entertainment system.

At 410, the one or more processors determine whether to add the new electronic device to the existing group based on the user feedback received at 408. When the new electronic device is not to be added to an existing group, flow moves to 412. Otherwise flow advances to 416. At 412, the one or more processors prompt the user as to whether the user desires to create a new group. If not, the process ends without adding the new electronic device to any group/list. When a new group is to be created at 412, flow moves to 414. At 414, the one or more processors steps through a series of questions and operations to create a new group that includes the newest electronic device, and one or more characteristics of interest related to the electronic device are saved with the new group list.

Returning to 410, when the new electronic device is to be added to an existing network, flow moves to 416. At 416, the one or more processors add the new electronic device to a list (e.g., 155 in FIG. 1) of electronic devices associated with an existing network. Characteristics of interest associated with the new electronic device are also added to the list.

At 418, optionally, context thresholds also be added to the list in connection with the newly added electronic device. The context thresholds relates to context awareness information that may be received from the corresponding newly added electronic device. For example, a context threshold may represent a binary threshold, such as whether the electronic device is actively being used at the time the system may seek to add the electronic device to a responsive collection. For example, a user may enter, as a context threshold, an indication that, when the user is speaking on a smart phone or working on a tablet device or computer, the smart phone, tablet device or computer should not be added to the responsive collection. Additionally or alternatively, the user may enter, as a context threshold, an indication that, when the user (e.g., an adult) is in a region proximate to the electronic device, the electronic device should not be added to a collective response based on a user input from select individuals (e.g., a child). The context threshold may represent a level of motion or activity to be detected in a local area of the newly added electronic device, before the newly added electronic device can be added to a responsive collection. Motion or activity thresholds may be useful to avoid playing music and other audio content over a DPA device in a child's bedroom.

Closing Statements

Before concluding, it is to be understood that although e.g., a software application for undertaking embodiments herein may be vended with a device such as the system 100, embodiments herein apply in instances where such an application is e.g., downloaded from a server to a device over a network such as the Internet. Furthermore, embodiments herein apply in instances where e.g., such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
   under control of one or more processors configured with executable instructions;
   receiving a user instruction to perform an action;
   identifying context awareness information concerning an environment where the action is to be performed, the environment including a plurality of candidate electronic devices, at least one of the candidate electronic devices to provide digital personal assistant (DPA) functionality;
   grouping a collection of one or more responsive electronic devices, from the plurality of candidate electronic devices, based on the context awareness information; and
   communicating the instruction to the collection of one or more responsive electronic devices to coordinate the action by the responsive collection.

2. The method of claim 1, wherein the plurality of electronic devices include a DPA device, and wherein one or more of the identifying, grouping and communicating are performed by the DPA device.

3. The method of claim 2, further comprising determining whether to include the DPA device in the collection of one or more responsive electronic devices that perform the action.

4. The method of claim 1, wherein the context awareness information includes information indicative of a condition present in the environment in which the corresponding electronic devices are located.

5. The method of claim 1, wherein the collection of one or more responsive electronic devices include multiple DPA devices, and wherein the communicating the instruction includes coordinating an operation of the multiple DPA devices to act jointly in a manner perceived by one or more individuals within the environment.

6. The method of claim 5, wherein the environment represents a physical region in which the multiple DPA devices are located and in which the joint action is one or more of heard, seen, or felt by the one or more individuals.

7. The method of claim 1, wherein the identifying includes determining activity in a region surrounding a first electronic device from the plurality of electronic devices.

8. The method of claim 7, wherein the determining activity is based on one or more of calendar data, motion data, sleep habit data or device usage data.

9. The method of claim 1, further comprising identifying the plurality of candidate electronic devices based on availability on a network.

10. A device, comprising:
    an input to receive a user instruction to perform an action;
    a processor;
    a memory storing program instructions accessible by the processor, wherein, responsive to execution of the program instructions, the processor performs the following:
        identifying context awareness information concerning an environment where the action is to be performed, the environment including a plurality of candidate electronic devices, at least one of the candidate electronic devices to provide digital personal assistant (DPA) functionality; and
        grouping a collection of one or more responsive electronic devices, from the plurality of candidate electronic devices, based on the context awareness information; and
    a transceiver to communicate the instruction to the collection of one or more responsive electronic devices to perform the action by the responsive collection.

11. The device of claim 10, wherein the device is a DPA device.

12. The device of claim 11, the processor further to modify the instruction to include a device command to open a streaming channel and to play audio content that is streamed to the collection of one or more responsive electronic devices.

13. The device of claim 10, wherein the context awareness information includes information indicative of a condition present in the environment in which the corresponding electronic devices are located.

14. The device of claim 10, wherein the collection of one or more responsive electronic devices include multiple DPA devices, and wherein the transceiver sends the instruction to the multiple DPA devices to coordinate an operation of the multiple DPA devices to act jointly in a manner perceived by one or more individuals within the environment.

15. The device of claim 10, further comprising an activity or control circuit including one or more of a motion sensor, light switch, room thermostat, door locking circuit, or appliance to provide the context awareness information.

16. The device of claim 10, the processor to determine activity in a region surrounding a first electronic device from the plurality of electronic devices, the activity associated with the contact awareness information.

17. The device of claim 16, the processor to determine the activity based on one or more of calendar data, motion data, sleep habit data or device usage data.

18. A computer program product comprising a non-signal computer readable storage medium comprising computer executable code to:
    receive a user instruction to perform an action;
    identify context awareness information concerning an environment where the action is to be performed, the environment including a plurality of candidate electronic devices, at least one of the candidate electronic devices to provide digital personal assistant (DPA) functionality;
    automatically group a collection of one or more responsive electronic devices, from the plurality of candidate electronic devices, based on the user instruction and the context awareness information; and
    communicate the instruction to the collection of one or more responsive electronic devices to perform the action by the collection of one or more responsive electronic devices.

19. The computer program product of claim 18, wherein the computer executable code further to store a list of one or more candidate electronic devices that are registered for use within a network, the list including unique identifying information for the electronic devices, as well as operating characteristics of the electronic devices relevant to a type of action that the electronic devices perform.

20. The computer program product of claim 18, wherein the computer executable code further to store a DPA device application that includes voice recognition, the DPA device application to interpret natural language input in spoken form to infer intent therefrom, and perform actions based on the inferred intent.

21. The method of claim 1, further comprising:
    analyzing context awareness information in connection with a plurality of regions within the environment corresponding to the plurality of candidate electronic devices; and
    grouping a collection of one or more responsive electronic devices, from the plurality of candidate electronic devices, based on the analyzed context awareness information.

* * * * *